United States Patent [19]

Hafner

[11] 4,049,463

[45] Sept. 20, 1977

[54] METHOD FOR PRODUCING A PURE CERIUM OXIDE

[75] Inventor: Leo Hafner, Althofen, Austria

[73] Assignee: Treibacher Chemische Werke Aktiengesellschaft, Treibach, Austria

[21] Appl. No.: 707,381

[22] Filed: July 21, 1976

[30] Foreign Application Priority Data

July 25, 1975 Austria ................................ 5803/75

[51] Int. Cl.$^2$ ............................................. C09C 1/00
[52] U.S. Cl. ................................ 106/288 B; 423/263; 106/309
[58] Field of Search ................ 106/288 B, 308 B, 309; 423/263

[56] References Cited

U.S. PATENT DOCUMENTS

| 3,725,100 | 4/1973 | Zentz, Jr. | 106/288 B |
| 3,850,653 | 11/1974 | Zentz, Jr. | 106/288 B |
| 3,942,998 | 3/1976 | Higgins | 106/298 |

*Primary Examiner*—Winston A. Douglas
*Assistant Examiner*—S. V. Howard
*Attorney, Agent, or Firm*—Kurt Kelman

[57] ABSTRACT

The brightness of a cerium oxide is improved by adding a boron compound to a cerium salt or a mixture of cerium salts, and the calcining the mixture in the presence of air in a conventional manner.

8 Claims, No Drawings

METHOD FOR PRODUCING A PURE CERIUM OXIDE

The present invention relates to a method of improving the brightness of a ceric or cerous oxide.

Tri- or tetravalent cerium is precipitated from solutions primarily as cerous oxalate or carbonate or cerium oxide hydrate after other rare earth metals have been removed from the solution. The precipitates are then calcined in the presence of air to obtain ceric oxide, $CeO_2$, of more than 99.9% purity. Pure ceric oxide is a light powder of yellowish hue. The intensity of the yellow hue depends, in addition to the presence of impurities, such as other rare earths, iron or manganese, on the precipitation conditions and the calcining temperature.

Ceria of a high brightness is desired in the use for ceramic surfaces, optical glass, as well as for polishing agents for glass, such as lenses and prisms. It is known to increase the brightness of ceria when sulfate ions in the amount of 0.1– 1% $SO_3/CeO_2$ are added to the cerium salts before calcining, for instance in the form of ammonium sulfate. However, ceria prepared in this manner still retains a noticeable yellow hue.

Published German Patent Application No. 2,145,820 discloses various brightening agents for ceric oxide, including aluminum nitrate, sodium silicate, magnesium oxide or mixtures of these additives in amounts of 0.1 to 0.5%, by weight, based on the $CeO_2$. These additives are mixed with moist cerous oxalate which has previously been neutralized to a pH of 7 with potassium hydroxide. After calcining, such cerous oxalate yield a more or less yellowish ceric oxide product which contains the additives as an unwanted impurity.

I have now found that the above disadvantages may be overcome and ceria of a considerably improved brightness may be obtained when a boron compound is added to the cerium salt before calcining. The boron compound may be added in the form of a solution, preferably a boric acid solution. Based on the weight of the cerium oxide, the boron compound is preferably added in an amount to provide, calculated as $B_2O_3$, 0.05 to 5%, preferably 0.5 to 1.5%, by weight, of the boron compound. A preferred calcining temperature range is between about 600° C and 1200° C, more preferably 750° C to 1050° C and most preferred 850° C to 950° C. It is preferred to agitate the mass during the calcining in the kiln, for instance by operating in a rotary kiln or by raking.

The invention will be illustrated by the following examples which, however, are not limitative. The reflectivity of the ceric oxide was measured with a brightness meter in comparison to magnesium oxide (brightness of MgO = 100%).

EXAMPLE 1

Three hundred grams of cerous oxalate having a moisture content of 41%, by weight, was suspended three times in 100 ml of boric acid solutions containing 20 g $H_3BO_3/l$. The liquid was removed each time through a suction filter. After the solid residue was calcined in the presence of air at a temperature of 900° C, 103 g of a ceria powder was obtained, containing 1.2%, by weight, of $B_2O_3$ and a brightness of 89%. By way of comparison, ceria powder produced in the same manner without any brightening additive had a brightness of 51% and ceria powder produced with the addition of sulfates (0.6% $SO_3/CeO_2$) had a brightness of 65%.

EXAMPLE 2

One hundred grams of moist cerous oxalate containing 35.6% $CeO_2$ was mixed with 0.6 g of ammonium pentaborate (crystalline) and the mixture was homogenized with a pestle, whereupon it was calcined at a temperature of 1150° C. The resultant ceria contained 0.8% $B_2O_3/CeO_2$. The brightness of the product was 84%. By way of comparison, cerix oxide calcined at that temperature without the addition of a boron compound had a brightness of 58%.

EXAMPLE 3

Three hundred grams of moist cerous carbonate containing 29.8% $CeO_2$ was mixed with 228 ml of a boric acid solution containing 17 g $H_3BO_3/l$. After suction filtering the excess liquid, the residue was calcined in the presence of air at 750° C. This yielded 89.4 g of ceric oxide containing 1% $B_2O_3$ and having a brightness of 86%.

EXAMPLE 4

One hundred grams of cerium oxide hydrate having a moisture content of 62.2%, by weight, was mixed with 0.27 g of $Na_2B_4O_7 \cdot 10H_2O$ and the mixture was calcined at 900° C. The resultant product had a content of 0.1% $B_2O_3/CeO_2$ and a brightness of 84%.

What is claimed is:

1. A method of improving the brightness of a cerium oxide, comprising the steps of adding a boron compound to a cerium salt or a mixture of cerium salts selected from the group consisting of cerium oxalate, cerium carbonate and cerium oxide hydrate, and then calcining the mixture in the presence of air, the boron compound being capable of producing $B_2O_3$ on calcining and being added in an amount to provide, calculated as $B_2O_3$, 0.05% to 5%, by weight, of the boron compound, based on the weight of cerium oxide.

2. The method of claim 1, wherein the boron compound is selected from ammonium pentaborate and $Na_2B_4O_1 \cdot 10H_2O$.

3. The method of claim 1, wherein the boron compound is added in the form of a solution.

4. The method of claim 1, wherein the boron compound is boric acid.

5. The method of claim 1, wherein the amount is 0.5 to 1.5%, by weight.

6. The method of claim 1, wherein the calcining temperature is between 600° C and 1200° C.

7. The method of claim 6, wherein the calcining temperature is between 750° C and 1050° C.

8. The method of claim 7, wherein the calcining temperature is between 850° C and 950° C.

* * * * *